(12) United States Patent
Wolfson

(10) Patent No.: US 10,495,339 B2
(45) Date of Patent: Dec. 3, 2019

(54) METHODS OF PROVIDING VENTILATION TO AN ENCLOSED SPACE

(71) Applicant: Tuckernuck Technology, L.L.C., Duxbury, MA (US)

(72) Inventor: Jason Wolfson, Marshfield, MA (US)

(73) Assignee: Tuckernuck Technology, L.L.C., Duxbury, MA (US)

(*) Notice: Subject to any disclaimer, the term of this patent is extended or adjusted under 35 U.S.C. 154(b) by 0 days.

(21) Appl. No.: 15/382,829

(22) Filed: Dec. 19, 2016

(65) Prior Publication Data

US 2018/0172304 A1  Jun. 21, 2018

(51) Int. Cl.

| | | |
|---|---|---|
| F24F 7/007 | (2006.01) | |
| F24F 11/77 | (2018.01) | |
| F24F 7/013 | (2006.01) | |
| E04H 6/02 | (2006.01) | |
| F24F 11/30 | (2018.01) | |
| F24F 11/00 | (2018.01) | |
| F24F 140/50 | (2018.01) | |
| F24F 11/61 | (2018.01) | |
| F24F 120/20 | (2018.01) | |
| F24F 110/10 | (2018.01) | |
| F24F 140/60 | (2018.01) | |
| F24F 140/40 | (2018.01) | |

(52) U.S. Cl.
CPC ............. *F24F 11/77* (2018.01); *E04H 6/02* (2013.01); *F24F 7/013* (2013.01); *F24F 11/0001* (2013.01); *F24F 11/30* (2018.01); *F24F 11/61* (2018.01); *F24F 2110/10* (2018.01); *F24F 2120/20* (2018.01); *F24F 2140/40* (2018.01); *F24F 2140/50* (2018.01); *F24F 2140/60* (2018.01); *Y02B 30/78* (2013.01)

(58) Field of Classification Search
CPC .... F24F 11/0079; F24F 7/013; F24F 11/0012; F24F 13/10; E04H 6/02
USPC .......................................... 454/343
See application file for complete search history.

(56) References Cited

U.S. PATENT DOCUMENTS

| | | |
|---|---|---|
| 6,110,038 A | 8/2000 | Stern |
| 6,169,488 B1 | 1/2001 | Ketler |
| 6,420,975 B1 | 7/2002 | DeLine et al. |
| 6,906,632 B2 | 6/2005 | DeLine et al. |
| 7,542,575 B2 | 6/2009 | DeLine et al. |
| 7,853,026 B2 | 12/2010 | DeLine et al. |
| 8,625,815 B2 | 1/2014 | DeLine et al. |
| 8,643,467 B2 | 2/2014 | Chutorash et al. |
| 8,855,793 B2 | 10/2014 | Bhargava et al. |
| 9,020,769 B2 | 4/2015 | Rada et al. |
| 9,230,378 B2 | 1/2016 | Chutorash et al. |

(Continued)

*Primary Examiner* — Helena Kosanovic
(74) *Attorney, Agent, or Firm* — Fish & Richardson P.C.

(57) ABSTRACT

A method of providing ventilation for an enclosed space includes detecting, by a controller including one or more processing devices, an operation of a door to the enclosed space in response to receiving a first signal indicative of an electrical characteristic of a motor that operates the door to the enclosed space. The method further includes generating, by the controller responsive to detecting the operation of the door, a control signal configured to operate a ventilation system to exhaust air from within the enclosed space to an environment outside of the enclosed space. The method also includes transmitting the control signal to cause an activation of the ventilation system.

31 Claims, 11 Drawing Sheets

(56) References Cited

U.S. PATENT DOCUMENTS

| | | |
|---|---|---|
| 9,432,210 B2 | 8/2016 | Bhargava et al. |
| 2003/0020603 A1 | 1/2003 | DeLine et al. |
| 2005/0066672 A1* | 3/2005 | Yamamoto ......... H05K 7/20209 |
| | | 62/186 |
| 2005/0156753 A1 | 7/2005 | DeLine et al. |
| 2006/0016201 A1* | 1/2006 | Kopel .................... G01K 13/00 |
| | | 62/129 |
| 2006/0061313 A1* | 3/2006 | Fitzgibbon .............. F04D 25/08 |
| | | 318/452 |
| 2009/0124189 A1* | 5/2009 | Barber ................ F24F 11/0001 |
| | | 454/258 |
| 2009/0232328 A1 | 9/2009 | DeLine et al. |
| 2010/0171588 A1 | 7/2010 | Chutorash et al. |
| 2011/0036699 A1* | 2/2011 | Daffin, III .............. H01H 43/10 |
| | | 200/38 A |
| 2011/0090338 A1 | 4/2011 | DeLine et al. |
| 2011/0251807 A1 | 10/2011 | Rada et al. |
| 2013/0081479 A1 | 4/2013 | Miller et al. |
| 2014/0070959 A1 | 3/2014 | Bhargava et al. |
| 2014/0074257 A1 | 3/2014 | Bhargava et al. |
| 2014/0119567 A1 | 5/2014 | DeLine et al. |
| 2014/0145824 A1 | 5/2014 | Chutorash et al. |
| 2015/0015369 A1* | 1/2015 | Lamb ...................... E05F 15/79 |
| | | 340/5.71 |
| 2015/0094828 A1 | 4/2015 | Bhargava et al. |
| 2015/0222517 A1* | 8/2015 | McLaughlin ........... H04W 4/70 |
| | | 713/156 |
| 2016/0117879 A1 | 4/2016 | Chutorash et al. |

\* cited by examiner

METHODS OF PROVIDING VENTILATION TO AN ENCLOSED SPACE

TECHNICAL FIELD

This specification relates to ventilation systems deployed in buildings.

BACKGROUND

When a garage is not properly ventilated, toxic fumes and vapors from cars and lawn and garden chemicals stored in a garage can easily enter other rooms of a residential home. The GarageVent™ ventilation system available from Lipidex Corporation of Marshfield, Mass. can facilitate ventilation of the garage such that the toxic fumes and vapors can be removed from the garage.

SUMMARY

In one aspect, a method of providing ventilation for an enclosed space includes detecting, by a controller including one or more processing devices, an operation of a door to the enclosed space in response to receiving a first signal indicative of an electrical characteristic of a motor that operates the door to the enclosed space. The method further includes generating, by the controller responsive to detecting the operation of the door, a control signal configured to operate a ventilation system to exhaust air from within the enclosed space to an environment outside of the enclosed space. The method also includes transmitting the control signal to cause an activation of the ventilation system.

In another aspect, a system to provide ventilation for an enclosed space includes a ventilation system positioned relative to the enclosed space to exhaust air from the enclosed space into an environment outside of the enclosed space. The system to provide ventilation further includes a sensor to generate a first signal indicative of an electrical characteristic of a motor that operates a door to the enclosed space. The system to provide ventilation also includes a controller including one or more processors in communication with the sensor and the ventilation system. The controller is configured to activate the ventilation system to exhaust air from within the enclosed space to an environment outside of the enclosed space in response to detecting operation of the door to the enclosed space based on the first signal from the sensor.

In a further aspect, a device to provide ventilation for an enclosed space includes a sensor to generate a first signal indicative of an electrical characteristic of a motor that operates a door to the enclosed space. The device also includes a controller including one or more processors in communication with the sensor and a ventilation system. The controller is configured to activate the ventilation system to exhaust air from within the enclosed space to an environment outside of the enclosed space in response to detecting operation of the door to the enclosed space based on the first signal from the sensor.

Implementations can include one or more of the features described below and herein elsewhere.

In some implementations, the enclosed space is a garage.

In some implementations, the electrical characteristic is selected from the group consisting of a current, a voltage, a power, and a frequency of the motor.

In some implementations, the first signal is indicative of closing of the door.

In some implementations, the first signal is indicative of opening of the door. In some cases, the method further includes receiving a second signal indicative of closing of the door during an operation of the ventilation system, and, responsive to receiving the second signal, deactivating the ventilation system after a duration of time. In some cases, the method further includes receiving a user input indicative of the duration of time.

In some implementations, the method further includes receiving a second signal indicative of a temperature within the enclosed space. The method also includes, for example, determining, based on the second signal, that the temperature is above a threshold. The method further includes, for example, responsive to determining that the temperature is above the threshold, operating the ventilation system to exhaust air from within the enclosed space to the environment. In some cases, the method also includes determining that the temperature is at or below the threshold, and, deactivating, responsive to determining that the temperature is at or below the threshold, the ventilation system. In some cases, the method further includes setting the threshold based on a user input indicative of the threshold.

In some implementations, transmitting the control signal to cause an activation of the ventilation system includes transmitting the control signal to cause an activation of an exhaust fan of the ventilation system to exhaust air from within the enclosed space to the environment outside of the enclosed space.

In some implementations, transmitting the control signal to cause an activation of the ventilation system includes transmitting the control signal to cause an activation of a forced air damper of the ventilation system to enable air within the enclosed space to be exhausted into the environment outside of the enclosed space.

In some implementations, the system or the device to provide ventilation further include an electrical interface configured to receive a connection for providing operating power to the motor.

In some implementations, the sensor is configured to generate the first signal in response to detecting a current drawn by the motor through the electrical interface.

In some implementations, the sensor is configured to be electrically connected to a user input device such that the sensor is capable of generating the first signal. The user input device is, for example, configured to be electrically connected to the motor and is manually operable to generate a control signal to operate the motor to initiate operation of the door to the enclosed space. In some cases, the controller is configured to receive power from a power delivery system that delivers power to the user input device.

In some implementations, the system or the device to provide ventilation further include a housing containing the sensor and the controller. The housing is configured, for example, to be physically connected to a housing of the user input device to electrically connect the sensor to the motor.

In some implementations, the system or the device to provide ventilation further include a housing containing the sensor and the controller. The housing is configured, for example, to be physically connected to a housing of the user input device to electrically connect the motor to the user input device.

In some implementations, the ventilation system includes an exhaust fan positioned to exhaust air from the enclosed space into the environment outside of the enclosed space.

In some implementations, the ventilation system includes a forced air damper positioned to enable air within the enclosed space to be exhausted into the environment outside of the enclosed space.

In some implementations, the controller is configured to receive a second signal indicative of closing the door to the enclosed space during an operation of the ventilation system; and, responsive to receiving the second signal, deactivate the ventilation system after a duration of time.

In some implementations, the system or the device to provide ventilation includes a user input device manually operable to set the duration of time.

In some implementations, the system or the device to provide ventilation includes a temperature sensor to generate a second signal indicative of a temperature within the enclosed space. The controller is configured to, for example, determine, based on the second signal, that the temperature is above a threshold, and operate, responsive to determining that the temperature is above the threshold, the ventilation system to exhaust air within the enclosed space to the environment when the temperature is above the threshold. In some cases, the controller is configured to determine that the temperature is at or below the threshold, and deactivate, responsive to determining that the temperature is at or below the threshold, the ventilation system. In some cases, the system or the device to provide ventilation includes a user input device manually operable to set a predefined temperature.

The systems and methods described herein may have advantages described below and herein elsewhere. The ventilation system may be selectively activated to improve air quality within the enclosed space. In one example, the enclosed space may have little passive ventilation absent the ventilation system when the door to the enclosed space is closed. The ventilation system may be activated such that the enclosed space can be ventilated when the door the enclosed space is closed. In another example, the ventilation system may be activated when it is likely that the enclosed space contains pollutants. For example, if the enclosed space is a garage, the operation of the ventilation system may be synchronized with the operation of the garage door to expel pollutants from a vehicle driving in or out of the garage. By using an operation of the garage door as an indicator of a motor vehicle operation within the garage, the ventilation system can be selectively activated to potentially maintain a substantially uniform quality of the air within the garage. By providing a sensor system that can be interfaced with an existing garage door system, the technology described herein may allow a user to incorporate the sensor system without elaborate installation procedures and/or professional help from specialists.

The details of one or more implementations of the subject matter described in this specification are set forth in the accompanying drawings and the description below. Other potential features, aspects, and advantages will become apparent from the description, the drawings, and the claims.

BRIEF DESCRIPTION OF THE DRAWINGS

Like reference numbers and designations in the various drawings indicate like elements.

DETAILED DESCRIPTION

When a motor vehicle is operated in an enclosed space, pollutants produced by an engine of the motor vehicle can accumulate in the absence of proper ventilation. In some cases, chemicals stored in an enclosed space may produce pollutants, e.g., toxic fumes, that accumulate within the enclosed space when a door the enclosed space is closed. When the enclosed space is attached to a residential home, pollutants contained within the enclosed space can enter the residential home. The enclosed space can be ventilated to remove air containing the pollutants from the enclosed space, for example, to prevent the polluted air from entering the residential home. The enclosed space can be selectively ventilated such that the ventilation occurs when a door to the enclosed space is closed. The enclosed space can also be selectively ventilated such that the ventilation occurs when pollutants produced by the motor vehicle are present or are likely to be present within the enclosed space. The methods and systems described herein can provide such selective ventilation to the enclosed space to improve air quality within the enclosed space.

Figure 1:
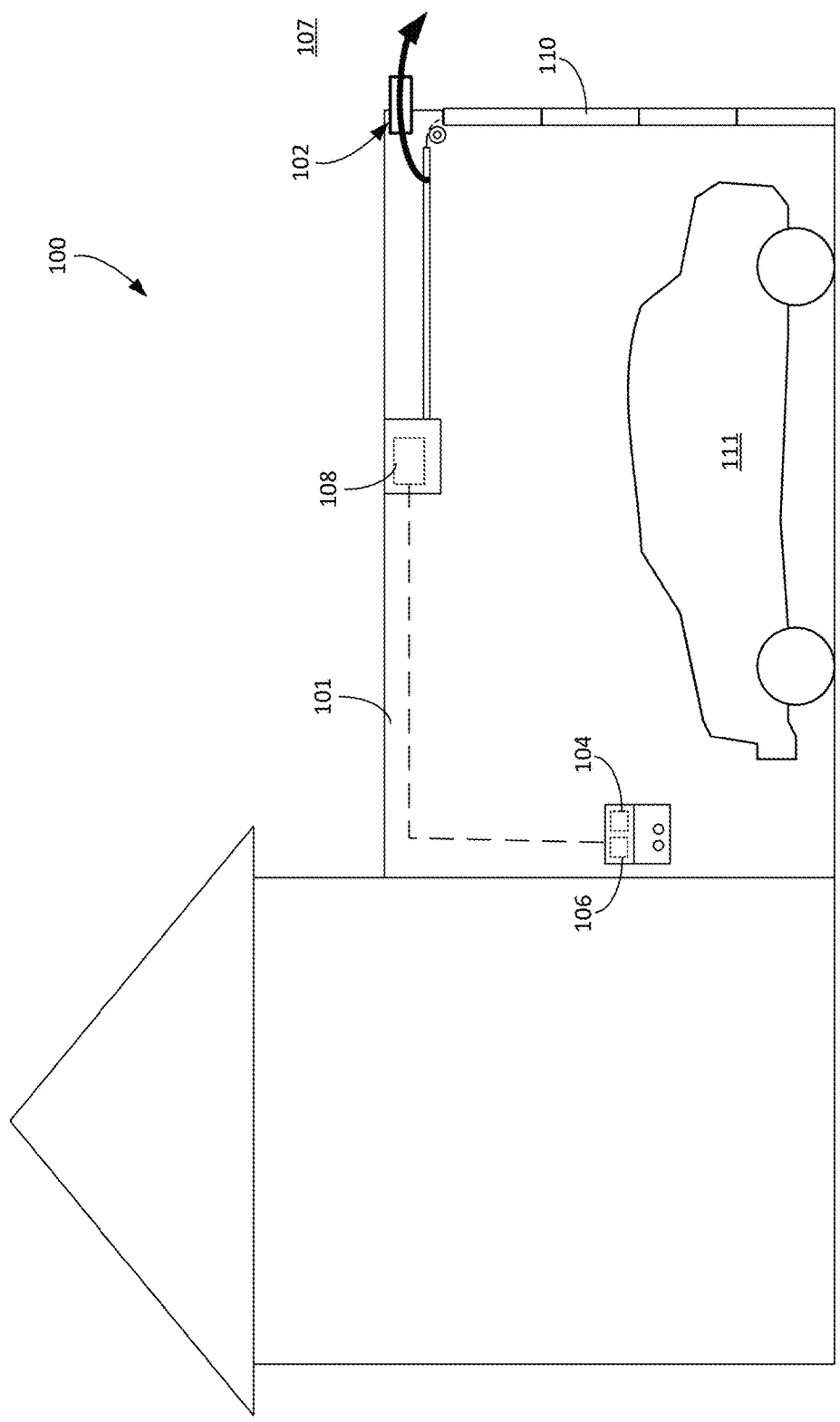
FIG. 1 is a plan view of an enclosed space with a ventilation system.
Figure 2:
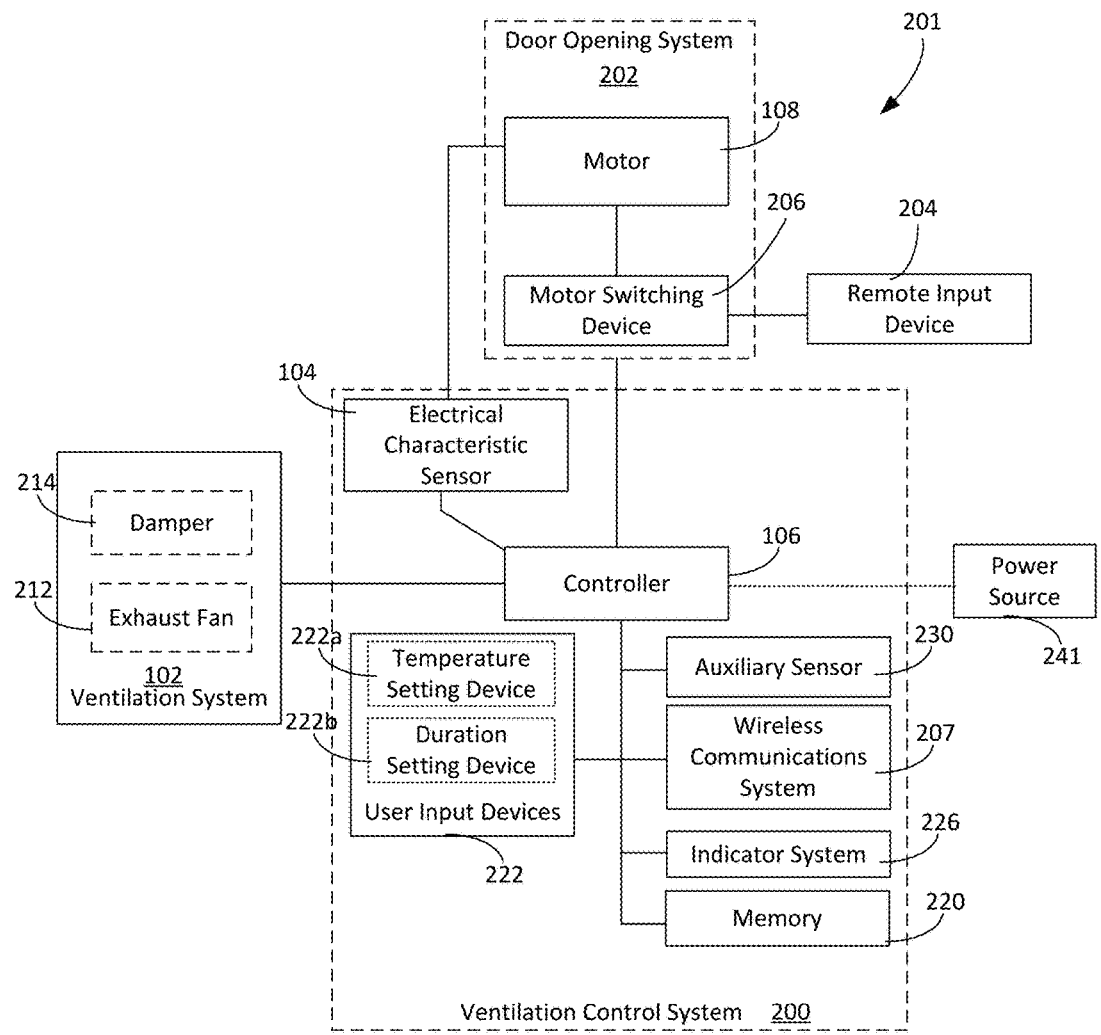
FIG. 2 is a block diagram of an example system in accordance with the technology described herein.
Figure 3:
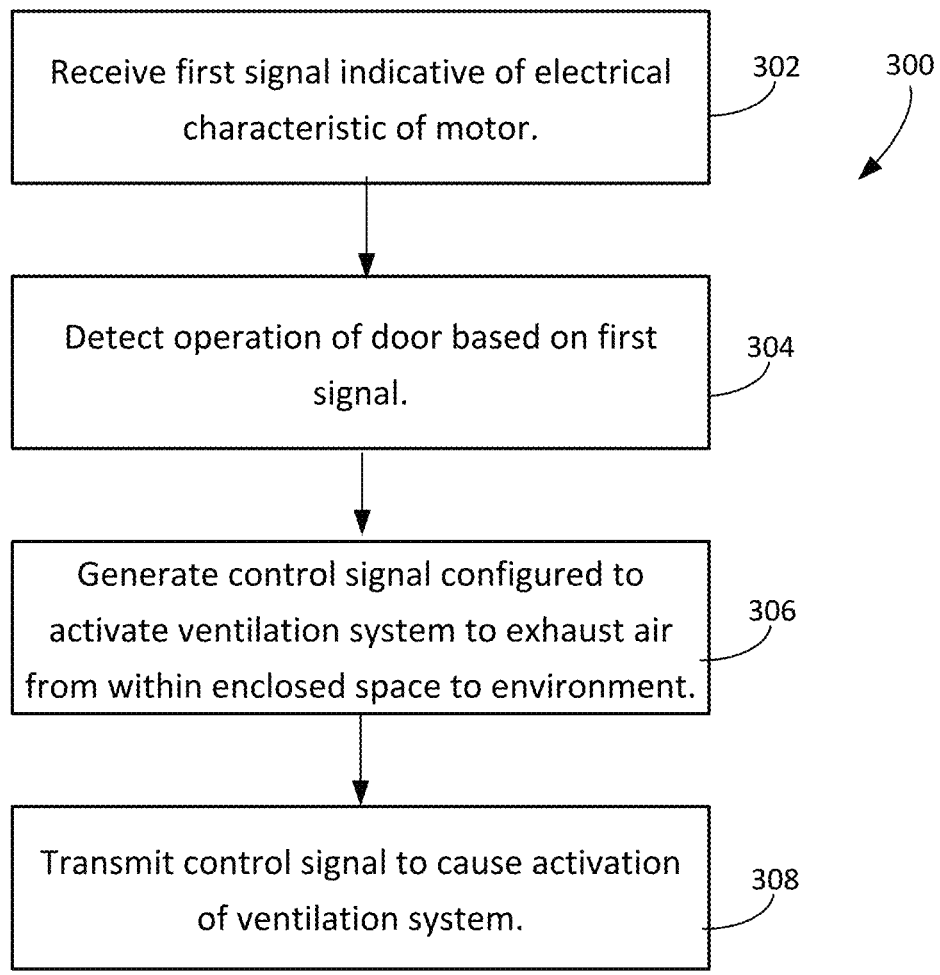
FIG. 3 is a flow chart of an example ventilation process in accordance with the technology described herein.

FIG. 1 depicts an example environment in which a system 100 is disposed. The system 100 provides ventilation for an enclosed space 101, in accordance to the technology described herein. FIG. 2 depicts a block diagram of circuitry 201 associated with the system 100 depicted in FIG. 1. The system 100 includes a ventilation system 102, a sensor 104, and a controller 106. As described with respect to FIG. 3, a process 300 can be executed to provide ventilation to an enclosed space, such as the enclosed space 101 described with respect to FIG. 1.

The ventilation system 102 is positioned relative to the enclosed space 101 to exhaust air from the enclosed space 101 into an environment 107 outside of the enclosed space 101. The ventilation system 102 is, for example, an exhaust fan that generates airflow from the enclosed space 101 to the environment 102. In some implementations, the ventilation system 102 is positioned, for example, within the enclosed space 101 such that an operation of the ventilation system 102 facilitates expulsion of air from within the enclosed space 101 to the environment 107. The ventilation system 102 can thus be operated to remove air containing pollutants from the enclosed space 101 to improve the air quality within the enclosed space 101.

The sensor 104 is configured to generate a first signal indicative of an electrical characteristic of a motor 108 that operates a door 110 to the enclosed space 101. The controller 106 includes, for example, one or more computer processors to perform operations facilitating ventilation of the enclosed space 101. The controller 106 is in communication with the sensor 104 and the ventilation system 102. In some cases, the controller 106 is in electrical communication with the sensor 104 and the ventilation system 102 such that electrical signals can be transmitted between the devices. In this regard, the controller 106 is, for example, electrically connected with the sensor 104, the ventilation system 102, or both. In some cases, the controller 106 is in wireless communication, e.g., over a radiofrequency channel, wireless optical channel, etc., with the sensor 104 and the ventilation system 102 such that wireless signals can be transmitted between the devices. In this regard, one or more of the controller 106, the sensor 104, and the ventilation system 102 include, for example, a wireless transceiver capable of transmitting and receiving wireless signals.

During operation, the controller 106 activates the ventilation system 102 to exhaust air from within the enclosed space 101 to the environment 107 in response to detecting an operation of the door 110 based on the first signal from the sensor 104. The operation of the door 110 can include, for example, a movement of the door 110, a closing of the door 110, an opening of the door 110, an activation of the motor 108 associated with the door 110, a deactivation of the motor 108 associated with the door 110, or other door-related operations. In some cases, the system 100 is used to execute the process 300 represented by the flow chart shown in FIG. 3. In the process 300 to provide ventilation to the enclosed space 101, a first signal is received at operation 302. For example, the controller 106 can receive the first signal from the sensor 104. As described with respect to FIG. 1, the first signal is indicative of an electrical characteristic of the motor 108, which is configured to operate the door 110 to the enclosed space 101.

At operation 304, an operation of the door 110 is in response to receiving the first signal from the sensor 104. At operation 306, a control signal is generated by the controller. The control signal is configured to activate the ventilation system 102 to exhaust air from within the enclosed space 101 to the environment 107. The controller 106, for example, generates the control signal in response to detecting the operation of the door 110. At operation 308, the control signal is transmitted to cause an activation of the ventilation system 102. The controller 106, for example, transmits the control signal to the ventilation system 102, thereby activating the ventilation system 102. When the ventilation system 102 is activated, air can be exhausted from the enclosed space 101 to the environment 107.

The enclosed space 101 is, for example, a walled and roofed structure. In some cases, the enclosed space 101 is a garage for storing one or more motor vehicles. The garage is, for example, a residential garage for storing one or more vehicles. In this regard, the enclosed space 101 is sized and dimensioned to store at least one vehicle.

The enclosed space 101 includes one or more openings that enable movement of air between the enclosed space 101 and the environment 107. The one or more openings can include, for example, apertures in the structure defining the enclosed space 101. The apertures can allow air to leak out from the enclosed space 101 into the environment 107. In some cases, the enclosed space 101 includes windows. In some cases, the windows can be operated using a wireless or electronic control signal. The windows, for example, may form a part of the ventilation system 102.

In some implementations, the door 110 is a garage door. In this regard, the door 110 is sized and dimensioned to provide an opening into the enclosed space 101 sufficiently large for one or more vehicles to enter the enclosed space 101 and be stored in the enclosed space 101.

A motor vehicle 111, when operated in the enclosed space 101, may produce pollutants that become trapped within the enclosed space 101. In particular, an engine of the motor vehicle 111 may produce pollutants while the motor vehicle 111 is being operated, e.g., by a user driving the motor vehicle 111. The ventilation system 102 can be operated in a manner to remove the pollutants from the enclosed space 101 by exhausting air containing the pollutants into the environment and allowing a flow of cleaner air into the enclosed space 101.

In some implementations, the ventilation system 102 is operated when the door 110 is closed. The first signal, for example, is generated during an operation to close the door 110, e.g., a motor operation to close the door 110 and is indicative of closing of the door 110.

Figure 4A:
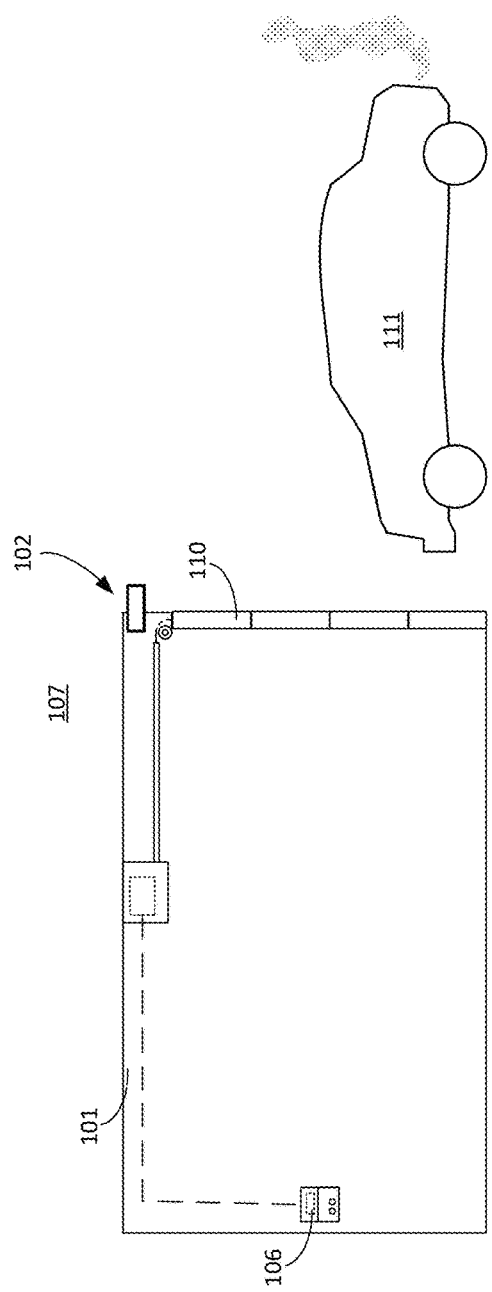
FIGS. 4A to 4D depict an enclosed space during a process of ventilating the enclosed space.
Figure 4B:
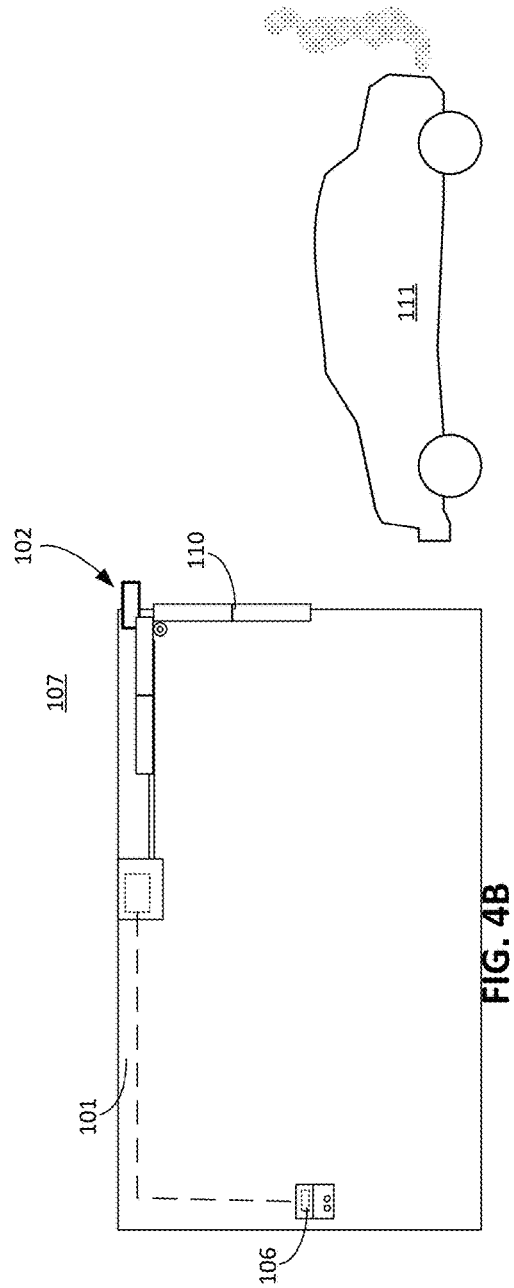
Figure 4C:
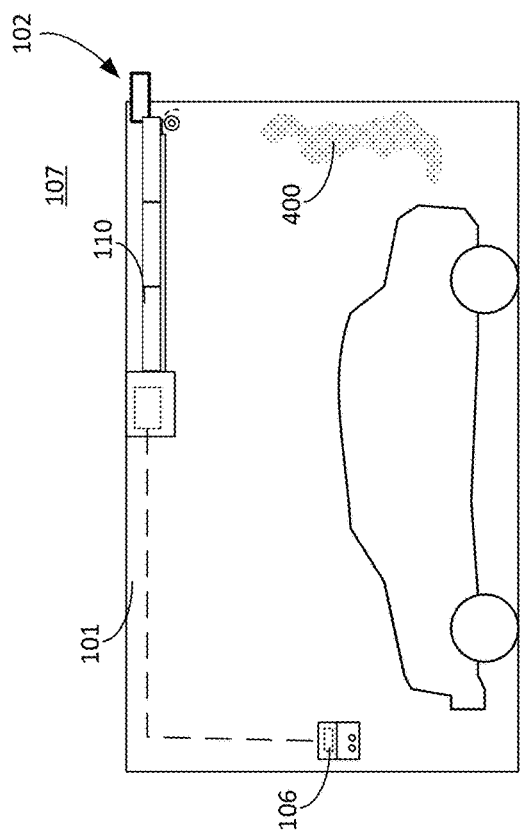
Figure 4D:
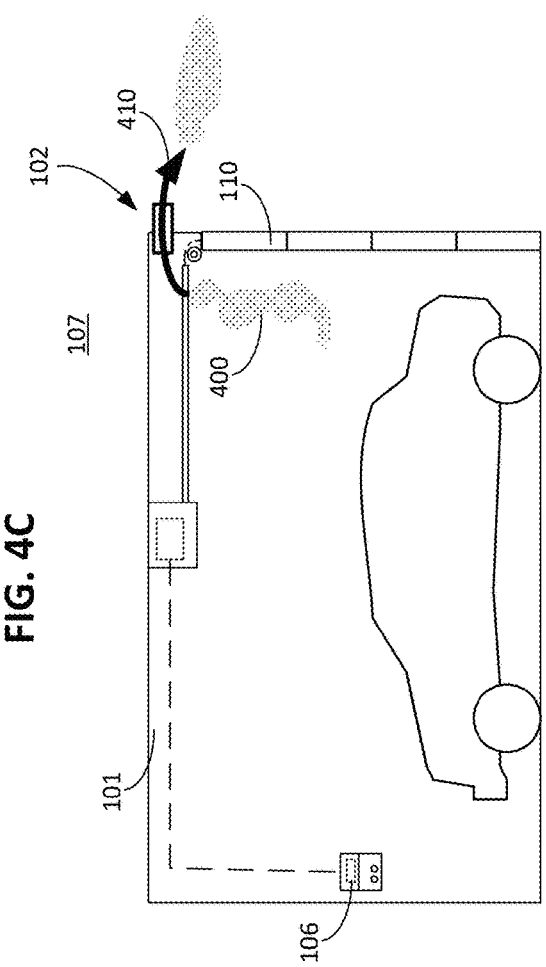

In an example process in which the ventilation system 102 is activated upon detection of the door 110 being closed, a user drives the motor vehicle 111 to the enclosed space 101, as shown in FIG. 4A. As shown in FIG. 4B, the user causes the door 110 to open, e.g., by operating a remote input device 204 (shown in FIG. 2), to enable a motor vehicle 111 to be driven into the enclosed space 101. When the door 110 is repositioned such that the motor vehicle 111 can enter the enclosed space, as shown in FIG. 4C, the user then drives the motor vehicle 111 into the enclosed space 101. The motor vehicle 111, as a result, may be operating for a short duration of time within the enclosed space 101, thereby releasing pollutants 400 into the enclosed space 101. As shown in FIG. 4D, the user then closes the door 110, e.g., by operating the remote input device 204 or by operating a door opener coupled to the controller 106 described herein. With the door 110 closed, the enclosed space 101 may contain a portion of the pollutants 400 released by the motor vehicle 111. A control signal is transmitted to activate the ventilation system 102 when the door 110 is closed, the control signal being generated responsive to the controller 106 detecting a closing of the garage door. Upon activation, the ventilation system 102 ventilates the enclosed space 101 to exhaust air containing the pollutants produced by the engine of the motor vehicle 111 into the environment 107. As shown in FIG. 4D, the ventilation system 102 enables a flow of air 410 to expel pollutants from the enclosed space 101 into the environment 107.

Alternatively or additionally, the ventilation system 102 is operated when the door 110 is opened. The first signal in this case is generated, for example, responsive to detecting an operation to open the door 110, e.g., a motor operation to open the door 110. In this regard, the first signal is indicative of opening of the door. In an example process in which the ventilation system 102 is activated upon detection of the door 110 being opened, a user opens the door 110 to enable a motor vehicle 111 to be driven into the enclosed space 101. Rather than the control signal being transmitted when the door 110 is closed, the control signal is transmitted to cause the ventilation system 102 to be activated when the door 110 is open. The ventilation system 102 therefore is operating as the motor vehicle 111 is driven into the enclosed space 101, as the motor vehicle 111 is operated within the enclosed space 101, and after the door 110 is closed. The ventilation system 102, in some cases, remains activated for a duration of time after the door 110 is closed.

Referring to FIG. 2, in some implementations, the circuitry 201 includes a ventilation control system 200 including the controller 106 and the sensor 104. The ventilation control system 200 is connected, e.g., electrically connected, to the ventilation system 102 and a door opening system 202 including the motor 108. The sensor 104 is connected to the controller 106 and is connected, or configured to be connected, to the motor 108. The sensor 104 is configured to measure one or more electrical characteristics of the motor 108 when the sensor 104 is electrically connected to the motor 108. In one example described herein with respect to FIGS. 5A-5L, the sensor 104 is electrically connected to circuitry of the motor 108 to generate the first signal based on the current transmitted to drive the motor 108. The controller 106 is connected to the ventilation system 102. The ventilation control system 200, in some cases, includes an auxiliary sensor 230 that generates a second signal usable by the ventilation control system 200 to determine when the ventilation system 102 is to be activated. Types of auxiliary sensors are described herein elsewhere.

In some cases, the remote input device 204 is operable by the user to control an operation of the motor 108. The door opening system 202 includes, in some examples, a motor switching device 206. The motor switching device 206 includes a switch that, when triggered, causes activation of the motor 108. In some examples, the remote input device 204 is a remote controller that is manually operable to transmit a signal, e.g., an optical signal, to be received by a receiver of the motor switching device 206, which causes the motor 108 to be activated. In some implementations, the remote input device 204 is a remote computing device, e.g., a smartphone, that transmits the signal to be received by the receiver of the motor switching device 206, thereby triggering the switch of the motor switching device 206. Alternatively or additionally, the motor switching device 206 is configured to be connected to the motor 108, and includes a user input device that is manually operable to trigger the switch of the motor switching device 206. When the switch is triggered, the motor 108 is activated. The switch is also triggered to deactivate the motor 108 when the receiver of the motor switching device 206 receives another signal. The signal received by the receiver can be a trigger signal that switches the state of the switch, e.g., between an active state in which the motor 108 is activated and an inactive state in which the motor 108 is not activated. In some implementations, the receiver receives an activation signal to trigger the switch into the active state and receives a different deactivation signal to trigger the switch into the inactive state. When the switch of the motor switching device 206 is in the active state, the motor switching device 206 enables power to be delivered to the motor 108, thereby activating the motor 108.

In some implementations, if the enclosed space 101 includes multiple motorized doors, the motor switching device 206 includes a corresponding switch for each of the motorized doors. The receiver of the motor switching device 206, for example, receives a signal to trigger the corresponding switch. Each motorized door is selectively and independently operable, e.g., the motor of each motorized door is selectively and independently operable.

The ventilation system 102 can facilitate movement of air from the enclosed space 101 into the environment 107 and thus can include one or more devices to actively or passively cause air to be exhausted into the environment 107. In some implementations, the ventilation system 102 includes an exhaust fan 212 to be activated by the controller 106. In this regard, the control signal is transmitted to activate the exhaust fan 212, e.g., to activate a motor that rotates the exhaust fan 212. The exhaust fan 212 is positioned relative to the enclosed space 101 such that rotation of the exhaust fan 212 moves air from within the enclosed space 101 to the environment 107. The ventilation system 102 includes, in some cases, multiple exhaust fans positioned in different locations relative to the enclosed space 101, e.g., at locations proximate opposite sides of a perimeter of the enclosed space 101.

Alternatively or additionally, the ventilation system 102 includes an intake fan to move air from the environment 107 into the enclosed space 101. For example, a control signal is transmitted to activate the intake fan, which moves air from the environment 107 into the enclosed space 101. If the air in the environment is less polluted than the air within the enclosed space 101, the intake fan may be activated to improve the air quality within the enclosed space 101 by bringing fresh air from the environment 107 into the enclosed space 101. In another example, the intake fan is activated during an operation of the exhaust fan 212 such that air from the environment 107 is brought into the enclosed space 101 while air from the enclosed space 101 is exhausted out into the environment 107. The simultaneous operation of the exhaust fan 212 and the intake fan can enable an air flow rate into the enclosed space 101 that is similar to an air flow rate out of the enclosed space. The intake fan can control the origin of air drawn into the enclosed space 101. The air drawn into the enclosed space 101 can originate from a known source with an air quality acceptable for the enclosed space.

Alternatively or additionally, the ventilation system 102 includes a forced air damper 214. The control signal is transmitted to cause an activation of the forced air damper 214, e.g., to open the forced air damper 214 such that air from the enclosed space 101 is movable from the enclosed space 101 to the environment 107 through the forced air damper 214. In particular, when activated, the forced air damper 214 enables air within the enclosed space 101 to be exhausted into the environment 107.

The ventilation system 102 includes, in some cases, multiple forced air dampers. In some implementations, the ventilation system 102 includes a combination of one or more forced air dampers, one or more intake fans, and one or more exhaust fans. The controller 106 can transmit multiple control signals to activate multiple devices of the ventilation system 102. The controller 106, for example, transmits a control signal to each device of the ventilation system 102 upon detecting the operation of the door 110. For instance, if the ventilation system 102 includes both an intake fan and an exhaust fan, the controller 106 can transmit two distinct control signals, one of which is transmitted to operate the intake fan, and the other of which is transmitted to operate the exhaust fan.

The sensor 104 can generate the first signal indicative of the operation of the door 110 based on an operation of the motor 108 driving the door 110, and the controller 106 operates the ventilation system 102 based on the operation of the motor 108. The operation of the motor 108 corresponds to, for instance, an activation of the motor 108, an active state of the motor 108, or an inactive state of the motor 108. In some cases, the sensor 104 measures an electrical characteristic associated with the operation of the motor 108. The first signal generated by the sensor 104 is, for example, indicative of the operation of the motor 108.

In some implementations, the electrical characteristic indicated by the first signal is a current, a voltage, a power, or a frequency of the motor 108. The electrical characteristic, for example, can include an electrical characteristic associated with the motor 108 when the motor 108 is activated or operated. In one example, to activate the motor 108, power is provided to the motor 108, e.g., from a power source such as an electrical outlet or battery. The activation of the motor can be represented by one or more electrical parameters such as an associated current, voltage, or magnitude of power. In some cases, the motor has an associated operational frequency measurable by the sensor. The sensor measures the current, the voltage, power, and/or frequency and generates the first signal when the current, voltage, magnitude and/or frequency are outside of a corresponding predefined range, e.g., above a predefined threshold, below a predefined threshold, or within an upper and lower bound.

Example electrical circuitry in which the electrical characteristic is a current used to drive the motor 108 is described with respect to FIGS. 5A-5L In some implementations, the sensor 104 continuously measures the electrical characteristic and transmits a stream of sensor signals to be received by the controller 106. The controller 106, in turn, determines when one of the sensor signals is above a predefined threshold, indicating that the motor 108 is, e.g., being operated to open the door 110 or to close the door 110. In this regard, the sensor signal that exceeds the predefined threshold corresponds to the first signal. Alternatively or additionally, the sensor 104 includes a component to determine when the sensor signal is above the predefined threshold. The sensor 104, for example, includes a comparator that generates the first signal when the sensor signal is above the predefined threshold.

In some cases, the first signal is indicative of an operation or a state of the door 110. The motor 108, for example, is operable to reposition the door 110 between a closed position and an open position, and the first signal is indicative of an operation of the motor 108 to reposition the door 110. In some examples, the first signal is indicative of an operation of the motor 108 to close the door, e.g., an operation to move the door 110 to the closed position. In some examples, the first signal is indicative of an operation to open the door, e.g., an operation to move the door 110 to the open position. Alternatively or additionally, the first signal is indicative of the door 110 being in the open position, or the first signal is indicative of the door 110 being in the closed position.

The ventilation control system 200 can operate the ventilation system 102 based on a predefined operational setting defining when the ventilation control system 200 generates the control signal to active the ventilation system 102 and when the ventilation control system 200 generates a control signal to deactivate the ventilation system 102. The first signal is, for example, generated based on the predefined operational setting, which includes data entered by a user and/or data stored on memory 220 (FIG. 2). If the predefined operational setting includes data stored on the memory 220, the controller 106 accesses the memory 220 and retrieves the data stored on the memory 220. If the predefined operational setting includes data entered by the user, the user operates a user input device, e.g., one or more user input devices 222 of the ventilation control system 200, a remote input device, etc. In some implementations, the data entered by the user is stored on the memory 220. Alternatively, the user input device 222 is implemented in hardware so that the user can adjust the predefined operational setting by adjusting a characteristic of a hardware component, e.g., an electrical resistance of a variable resistor.

As described herein, the user input devices 222 include, for example, a temperature setting device 222a and/or a duration setting device 222b. The user input devices 222, for example, includes a knob, switch, or other manually operable device to adjust the operational setting. In some examples, the user input devices 222 corresponds to a touchscreen display operable by the user to adjust one or more operational settings. In some examples, the user input devices 222 include a stop or start input device to enable the user to manually stop or initiate operation of the ventilation system 102 and/or the motor 108.

The ventilation control system 200 can operate the ventilation system 102 to exhaust air in the enclosed space 101 when the air temperature is high, which can serve as an indicator of poor air quality. In one specific example, the predefined operational setting corresponds to a threshold temperature in the enclosed space 101 at which the control signal is transmitted to operate the ventilation system 102. In some cases, the user operates the temperature setting device 222a to adjust the threshold temperature. Alternatively or additionally, the user operates a remote input device to adjust the temperature setting.

The auxiliary sensor 230 is a temperature sensor to generate a second signal indicative of the temperature in the enclosed space 101. The controller 106 of the ventilation control system 200 determines when the temperature in the enclosed space 101 is greater than the threshold temperature defined by the predefined operational setting based on the second signal. In response to determining that the temperature in the enclosed space 101 is greater than the threshold temperature, the controller 106 operates the ventilation system 102 to exhaust air from the enclosed space 101 to the environment 107.

The temperature can also be used to determine when to deactivate the ventilation system 102. The controller 106 determines that the temperature is at or below the temperature threshold based on a third signal from the temperature sensor. In response to determining that the temperature is at or below the temperature threshold, the controller 106 deactivates the ventilation system 102. The temperature threshold can be set to, for example, 36 degrees Celsius to 46 degrees Celsius.

In certain implementations, the auxiliary sensor 230 includes a sensor that detects environmental conditions of the environment 107 and determines that the air quality of the environment 107 is not presently desirable. The controller 106 can inhibit operations of the ventilation system 102 when the air quality is not desirable. The sensor can be used to detect a combination of air conditions in the environment 107 that would cause a greater amount of natural ventilation through leaks in the envelope of the enclosed space 101 from the environment 107. The sensor can detect, for example, humidity and temperature of the environment 107 that would be conducive to natural inflow of fresh air from the environment 107. When the natural ventilation is high, the controller 106 can reduce the outflow of air generated by the ventilation system 102 to account for this natural ventilation, thereby reducing the amount of energy expended by the ventilation system 102.

In some examples, the auxiliary sensor 230 includes a sensor that detects when passive ventilation devices, such as windows or doors, are allowing natural ventilation to infiltrate into the enclosed space 101. The controller 106 can reduce the amount of air flow generated by the ventilation system 102 to account for the additional circulation facilitated by the passive ventilation devices. In some implementations, the controller may also be configured to operate a passive ventilation device (e.g., a motorized window) to aid in a ventilation process.

In another example, the predefined operational setting includes a duration of time during which the ventilation system 102 is active. In one example, the duration of time corresponds to a delay between activation of the ventilation system 102 and deactivation of the ventilation system 102. The controller 106 deactivates the ventilation system 102 when the duration of time has elapsed after transmitting the control signal to activate the ventilation system 102. The duration of time can be set to be between, for example, 0 and 2 hours.

In another example, the controller 106 activates the ventilation system 102 upon detecting the door 110 is closed based on a second signal generated by the sensor 104. In this regard, the first signal generated by the sensor 104 indicates that the door is open. The duration of time corresponds to a delay between receiving the second signal and deactivation of the ventilation system 102. After the duration of time has elapsed, the controller 106 deactivates the ventilation system 102.

In some cases, the duration of time is selected based on a size of the enclosed space 101, e.g., a volume of the enclosed space 101. In some cases, the user inputs the size of the enclosed space 101, and the controller 106 determines the duration of time. In some cases, the user inputs the duration of time. In some implementations, the user operates the duration setting device 222b to adjust the duration of time. Alternatively or additionally, the user operates a remote input device to adjust the duration setting. In some cases, the duration of time is a predefined quantity stored in the memory 220.

In some cases, information pertaining to parameters of the ventilation system 102 may be stored in a memory accessible to a controller, to be used in determining the duration of time that the ventilation system 102 is to be active. In such cases, the duration of time that the ventilation system 102 is active may be determined based on stored information indicative of relevant physical or operational parameters of the ventilation system 102. For example, if the ventilation system 102 includes the exhaust fan 212, these parameters can include physical parameters associated with the exhaust fan 212, including, for example, a cross-sectional area of an air duct through which the air is exhausted by the exhaust fan 212, and/or information on fan dimensions. In one example, a fan speed of the exhaust fan 212 and the corresponding cross-sectional area of the air duct associated with the exhaust fan 212 can be used to determine the expulsion rate of the exhaust fan 212, which in turn can be used to determine the duration of time that the exhaust fan 212 is to be active.

In some implementations, a user inputs information pertaining to physical or operational parameters of the ventilation system 102, e.g., the exhaust fan 212 of the ventilation system 102. Such an interface can be provided, for example, as part of the ventilation control system 200. The information pertaining the ventilation system 102 can be used to determine the duration of time that the ventilation system 102 is active. In some implementations, the user interface can also be provided via an application executed on a computing device such as a mobile device. In such cases, the information received by the user interface can be provided to a corresponding controller through a network such as the Internet. The information can also be provided to a corresponding controller through local connections such as Bluetooth® or Wi-Fi connections. The information received by the user-interface can be used by the controller 106, for example, to determine the expulsion rate of the exhaust fans. In one example, if the ventilation system 102 includes the exhaust fan 212, the user interface can be used to receive make/model information of an exhaust fan 212, which can then be used to connect to a data repository (e.g., a database of fan models) to retrieve one or more parameters relevant to calculating the individual expulsion rate of the exhaust fan 212. In some cases, the user interface can be used to input one or more relevant operational or physical parameters associated with an exhaust fan and/or other structural/functional elements of the ventilation system. The expulsion rate of the exhaust fan 212, in turn, can be used to determine the duration of time that the exhaust fan 212 is to be active.

In some cases, the ventilation control system 200 includes an indicator system 226 to provide an indication to the user of an operational setting, e.g., a temperature threshold or a duration of time. The controller 106, for example, operates the indicator system 226 to provide an audible or a visual indication of the operational setting after or as the user selects the operational setting.

In some cases, the ventilation control system 200 includes an electrical interface to receive a connection for providing power to the motor 108. The ventilation control system receives power from a power source, e.g., a power delivery system to deliver 120-volt or 240-volt power through a wall outlet. In one example, the motor 108 receives power through a connection provided by the motor switching device 206, which in turn is connected to the power source. The motor switching device 206, for example, is directly connected to the power source 241. Alternatively or additionally, the ventilation control system 200 is connected to the power source 241 through the electrical interface, and the motor switching device 206 provides power to the motor 108 through the ventilation control system 200. The electrical interface receives the connection to provide the power to the motor 108 such that the sensor 104 generates the first signal in response to detecting a current drawn by the motor 108 through the electrical interface.

The ventilation control system 200 can be easily interface with an existing door opening system 202 for an enclosed space 101. The door opening system 202 can be an existing door opening system 202 for a user's garage, and the user connects the ventilation control system 200 to the existing door opening system 202 to enable the sensor 104 to measure the electrical characteristic of the motor 108 of the door opening system 202. By providing a sensor system that can be interfaced with an existing garage door system, the technology described herein may allow a user to incorporate the sensor system without elaborate installation procedures and/or professional help from specialists. In one example, the ventilation control system 200 is a standalone module that includes the controller 106 and the sensor 104. The module, for example, includes a housing containing the components of the ventilation control system 200. The housing and the electrical interface, for example, are configured such that the ventilation control system 200 is easily connected to the power source. The module, for example, can be plugged into a wall outlet to connect the ventilation control system 200 to the power source. The housing and the electrical interface are further configured such that the motor switching device 206 can be easily connected to the power source through the ventilation control system 200. The housing, for example, includes a socket such that the motor switching device 206 can be plugged into the socket to enable a quick connection between the power source and the motor 108 of the door opening system 202. In this regard, a housing of the motor switching device 206 is mountable to the housing of the ventilation control system 200 in a manner to electrically connect the motor 108 to the power source. If the motor 108 is connected to the power source through the motor switching device 206 and the ventilation control system 200, the sensor 104 of the ventilation control system 200 is connected to the motor switching device 206 such that the sensor 104 generates the first signal.

While the ventilation control system 200 is described as being electrically connected to the ventilation system 102 and the door opening system 202, the ventilation control system 200, in some cases, includes a wireless communications system 207 that enables wireless communication, e.g., over a wireless local area network, between the controller 106 and a remote computing device, e.g., the remote input device 204 or a separate computing device capable of wireless communication with the wireless communications system 207 of the ventilation control system 200. The wireless communications system 207 includes a wireless transceiver to transmit a wireless signal or to receive a wireless signal. In some implementations, the wireless communications system 207 enables communication of wireless signals, e.g., the control signal, between the ventilation system 102 and the ventilation control system 200 and/or communication of wireless signals between the ventilation control system 200 and/or the door opening system 202, e.g., a signal to control a motor operation.

In some implementations, the enclosed space 101 includes multiple door opening systems, and the ventilation system 102 includes a single exhaust fan, e.g., the exhaust fan 212. The door opening systems, for example, each has a corresponding controller. The controller 106 coordinates operation of the ventilation system 102 based on signals from the multiple controllers of the door opening systems. The controller 106 activates the ventilation system 102 based on one or more signals from one or more of the door opening systems. In some examples, the controller 106 activates the ventilation system 102 when the one or more signals indicate that one or more of doors of the door opening systems are being operated.

A number of configurations are appropriate for the circuitry 201 described herein. An example configuration is depicted in FIGS. 5A-5L which show various portions, 500A-500L, respectively, of a circuit. The circuit includes circuit elements associated with the ventilation control system 200, the ventilation system 102, and the door opening system 202. The circuit includes a microprocessor 500A, motor circuitry 500B, exhaust fan circuitry 500C, switch circuitry 500D, power indicator circuitry 500E, status indicator circuitry 500F, current sensor circuitry 500G, temperature setting circuitry 500H, delay setting circuitry 500I, wireless module circuitry 500J, door opening switch circuitry 500K, and thermistor circuitry 500L shown in FIGS. 5A-5L, respectively.

Figure 5A:
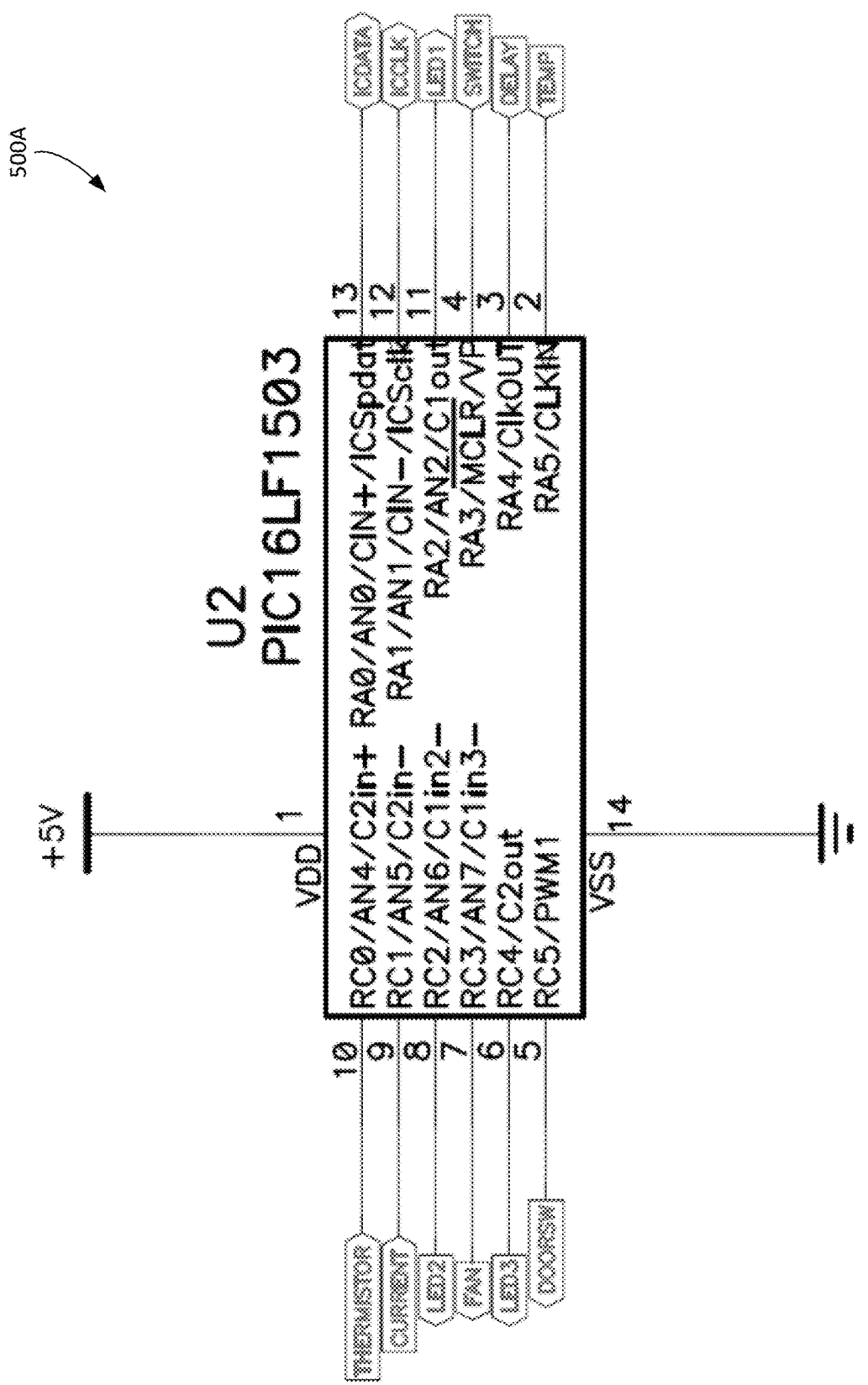
FIGS. 5A to 5L are circuit diagrams of portions of a circuit associated with a ventilation system.

The microprocessor 500A can be disposed, for example, in the controller 106 that is electrically connected to the other circuitry 500B-500L to receive data signals from the other circuitry 500B-500L The particular example shown in FIG. 5A illustrates a 14-pin microprocessor as the microprocessor 500A. At input terminal 2, the microprocessor 500A is connected to the temperature setting circuitry 500H. At input terminal 3, the microprocessor 500A is connected to the delay setting circuitry 500I. At input terminal 4, the microprocessor 500A is connected to the switch circuitry 500D. At input terminals 12 and 13, the microprocessor 500A is connected to the wireless module circuitry 500J using connections ICDATA and ICCLK. At input terminal 9, the microprocessor 500A is connected to the current sensor circuitry 500G. At input terminal 10, the microprocessor 500A is connected to the thermistor circuitry 500L.

At output terminal 5, the microprocessor 500A is connected to the door opening circuitry 500K. At output terminal 6, the microprocessor 500A is connected to the status indicator circuitry 500F using connection LED3. At output terminal 7, the microprocessor 500A is connected to the exhaust fan circuitry 500C. At output terminal 8, the microprocessor 500A is connected to the status indicator circuitry 500F using connection LED2. At output terminal 11, the microprocessor 500A is connected to the status indicator circuitry 500F using connection LED1.

Figure 5B:
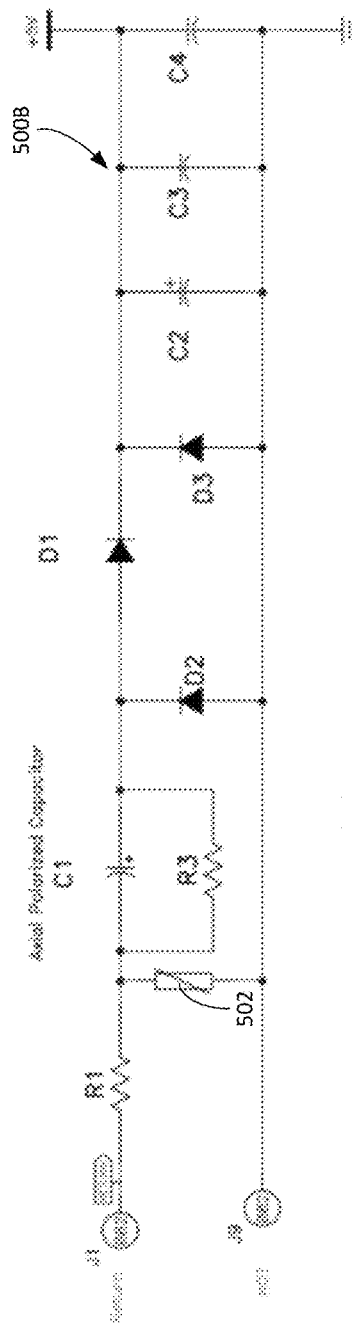

Referring to FIG. 5B, the motor circuitry 500B is, for example, motor circuitry of the motor 108 described herein. The motor circuitry 500B includes a load 502 corresponding to the solenoid used to drive the motor 108. The motor circuitry 500B includes a power supply including circuit elements, e.g., diodes D1, D2, D3 and capacitors C2, C3, C4, to supply the power to the motor 108. The motor circuitry 500B is connected to the current sensor circuitry 500G so that the current sensor circuitry 500G can output a signal indicative of a current supplied to the motor circuitry 500B to drive the load 502.

Figure 5C:
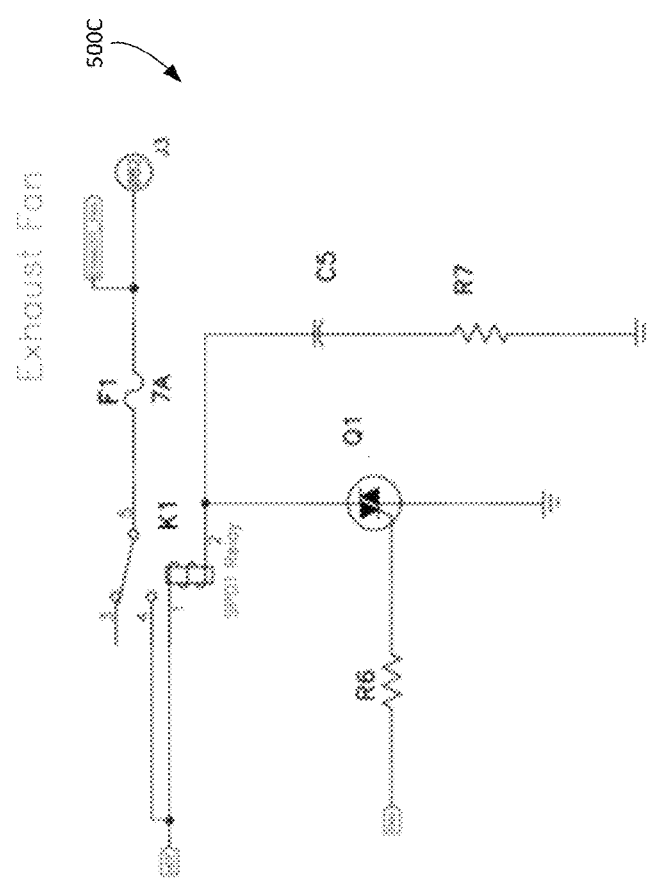

Referring to FIG. 5C, the exhaust fan circuitry 500C is connected to the exhaust fan 212 using the connection EXHAUST_FAN. The exhaust fan circuitry 500C includes switching circuitry, e.g., including a single pole double throw (SPDT) relay, that enables the microprocessor 500A to transmit an electrical signal to activate the exhaust fan 212.

Figure 5F:
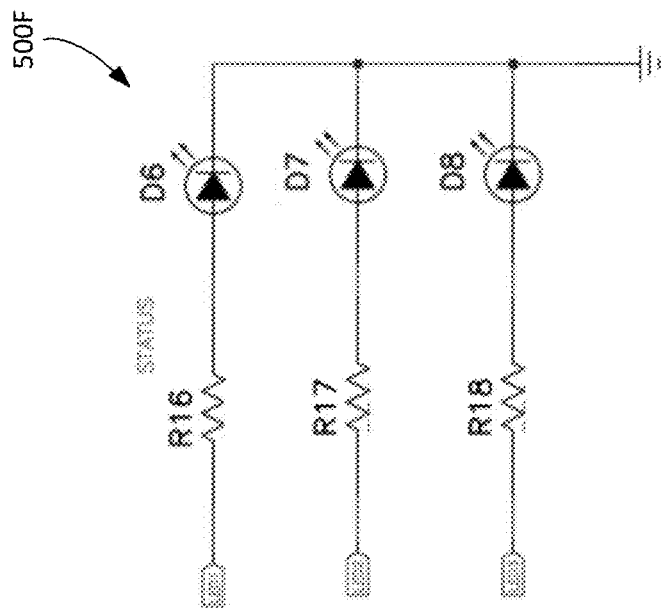
Figure 5D:
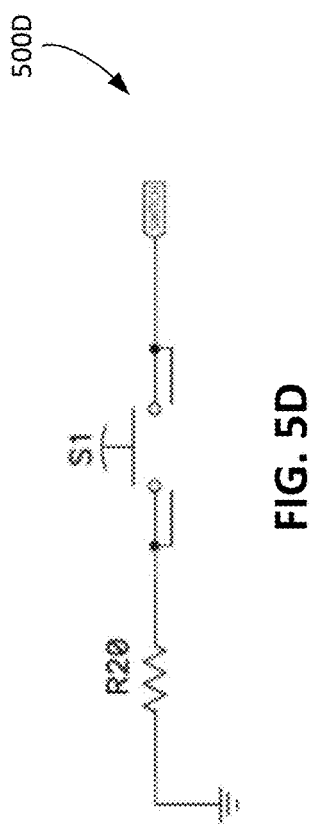
Figure 5E:
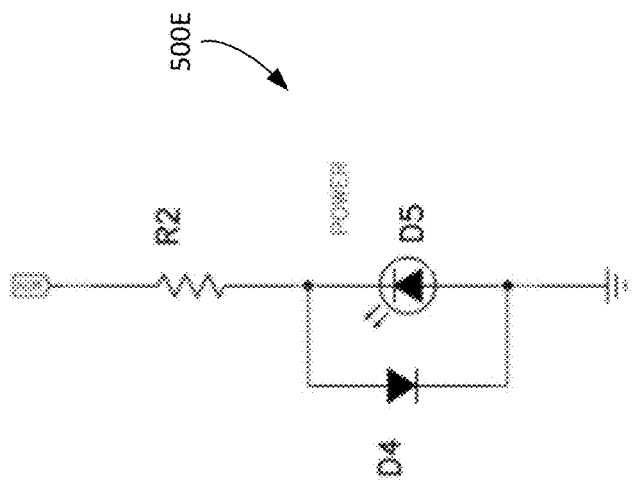

Referring to FIG. 5D, the switch circuitry 500D includes a manually operable switch S1 that, when operated, activates the circuitry. Referring to FIG. 5E, the power indicator circuitry 500E is connected in the circuitry in a manner such that light-emitting diode (LED) D5 is illuminated when the circuitry is powered.

Referring to FIG. 5F, the status indicator circuitry 500F corresponds to the circuitry for the indicator system 226 described herein to provide an indication to the user-selected operational settings. The status indicator circuitry 500F receives signals from the microprocessor 500A through connections LED1, LED2, and LED3 so that LEDs D6, D7, and D8 are selectively activated. In one example, one of the LEDs D6, D7, D8 is illuminated when the exhaust fan 118 has been activated. In another example, one of the LEDs D6, D7, D8 is illuminated when the motor 108 has been activated. In a further example, one of the LEDs D6, D7, D8 is illuminated when the microprocessor 500A detects an error associated with any portion of the circuitry 500.

Figure 5G:
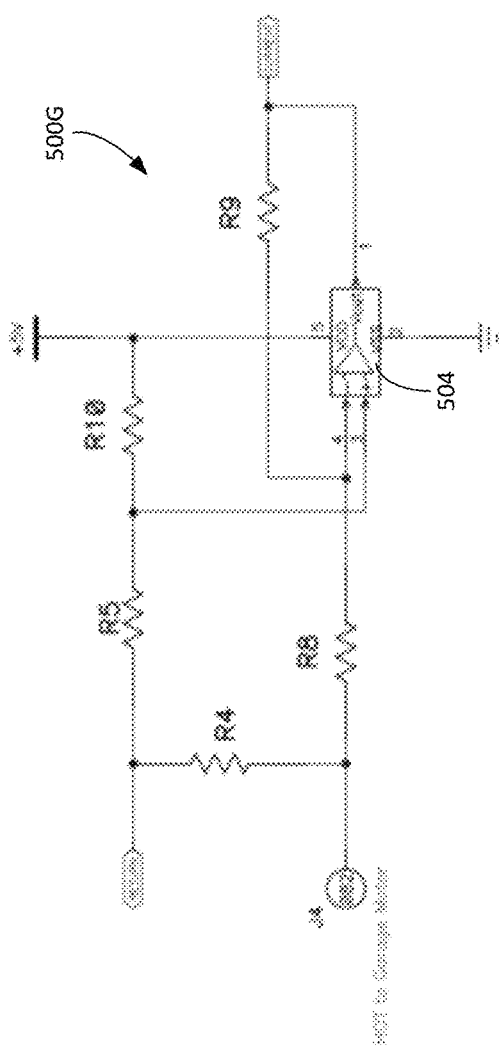

Referring to FIG. 5G, the current sensor circuitry 500G corresponds to the circuitry for the sensor 104 described herein. The current sensor circuitry 500G is electrically connected to the motor circuitry 500B through the HOT connection and the RETURN connection. The current sensor circuitry 500G generates a signal, e.g., the first signal described herein, and transmits the first signal to the microprocessor 500A through the CURRENT connection shown in FIG. 5G.

In one example the current sensor circuitry 500G measures a current draw of the motor 108 by measuring the voltage drop across a very low resistance, high current resistor and then amplifying that voltage to a range the microprocessor 500A can measure. To generate the first signal, the current sensor circuitry 500G includes an operational amplifier 504 with input terminal 4 connected in parallel to a sensing resistor R4 and input terminal 3 connected in parallel to the motor circuitry 500B. Output terminal 1 of the operational amplifier 504 is connected to the microprocessor 500A so that the output signal from the operational amplifier 504 is transmitted to the microprocessor 500A. The output signal, for example, corresponds to the first signal. Based on the output signal of the operational amplifier 504, the microprocessor 500A transmits the signal to the exhaust fan circuitry 500C to activate the exhaust fan 118.

In one example, to determine whether the output signal from the current sensor circuitry 500G is indicative of door opening operation or door closing operation, the microprocessor 500A determines a status of the switch circuitry 500D. The microprocessor 500A receives a signal to initiate operation of the motor 108 each time the manually operable switch S1 is operated and tracks whether the signal corresponds to a signal to open the door 110 or to close the door 110. In this regard, the microprocessor 500A determines whether the output signal indicative of the door opening operation or the door closing operation based on the number of times that the manually operable switch S1 has been operated.

In another example, to determine whether the output signal from the current sensor circuitry 500G is indicative of door opening operation or door closing operation, the microprocessor 500A is programmable to include a first threshold current value indicative of the door opening operation and a second threshold current value indicative of the door closing operation. During the door opening operation, the motor 108 is driven with a larger torque and hence higher current because the door 110 is being driven against the force of gravity. During the door closing operation, the motor 108 is driven with a smaller torque and hence lower current because the door 110 is also being driven by the force of gravity. If the output signal is indicative of a value between the first threshold current value and the second threshold value, the microprocessor 500A determines that the door operation is a door closing operation. If the output signal is indicative of a value above the first threshold current value, the microprocessor 500A determines that the door operation is a door opening operation.

Figure 5H:
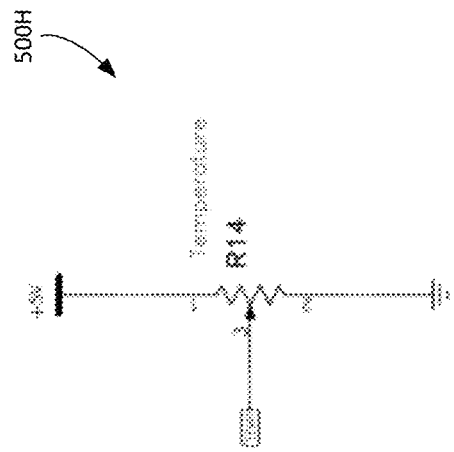

Referring to FIG. 5H, the temperature setting circuitry 500H corresponds to the circuitry for the temperature setting device 222a to enable the user to select the temperature threshold described herein. The temperature setting circuitry 500H includes, for example, a potentiometer R14 that is adjustable by the user to select a value of voltage transmitted to the microprocessor 500A. The microprocessor 500A receives the output signal of the temperature setting circuitry 500H through the TEMP connection, and the microprocessor 500A selects the temperature threshold based on the output signal, e.g., based on the selected value of the voltage.

Figure 5J:
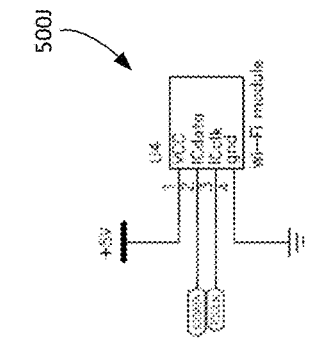
Figure 5L:
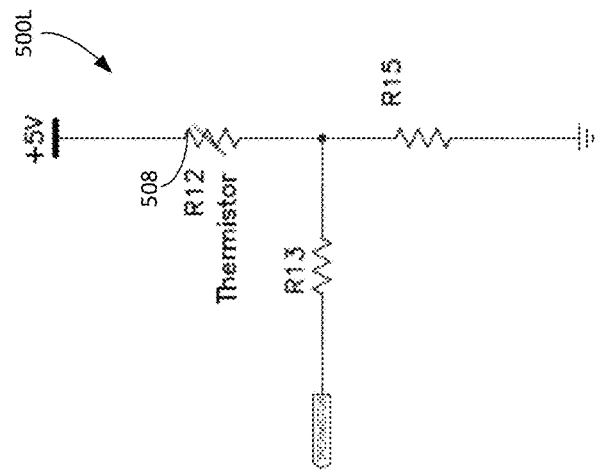
Figure 5I:
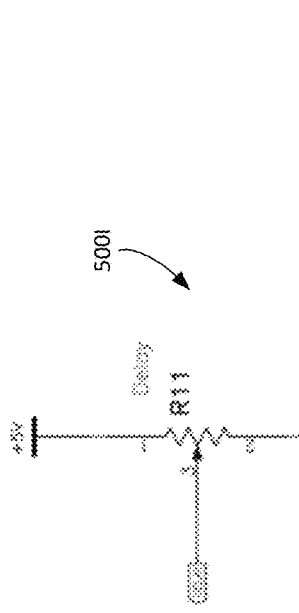

Referring to FIG. 5I, the delay setting circuitry 500I corresponds to the circuitry for the duration setting device 222b to enable the user to select the duration of time that the exhaust fan 118 is activated. The delay setting circuitry 500I includes, for example, a potentiometer R11 that is adjustable by the user to select a value of voltage transmitted to the microprocessor 500A. The microprocessor 500A receives the output signal of the delay setting circuitry 500I through the DELAY connection, and the microprocessor 500A selects the temperature threshold based on the output signal, e.g., based on the selected value of the voltage.

Referring to FIG. 5J, the wireless module circuitry 500J corresponds to the circuitry for the wireless communication system 207 described herein. In this example, the circuitry 500J includes a Wi-Fi® module. However, other wireless transceivers such as a Bluetooth® module may also be used. In some implementations, the circuitry 500J may facilitate connections with other networked devices, for example, as a part of a smart home environment where multiple devices can communicate with one another and/or an access point connected to the Internet.

Figure 5K:
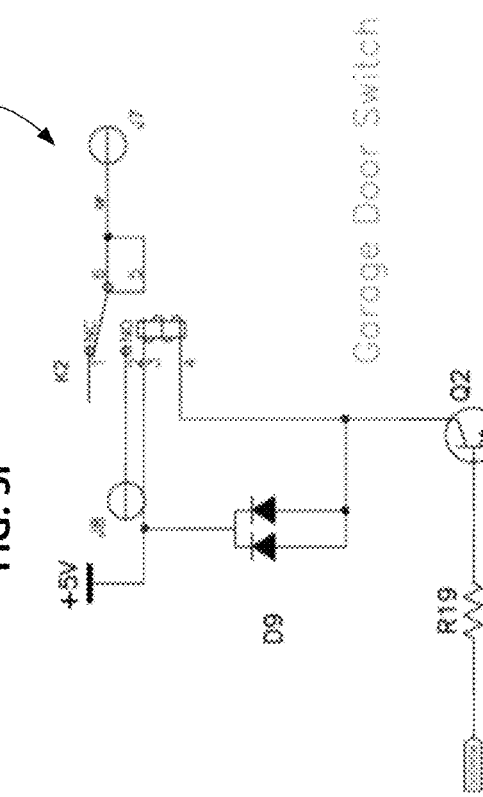

Referring to FIG. 5K, the door opening switch circuitry 500K corresponds to circuitry for enabling the ventilation control system 200 to be electrically connected to the motor switching device 206. The motor switching device 206 is, for example, electrically connected to terminals J7, J8. The microprocessor 500A transmits a signal through the DOORSW connection to trigger the door opening circuitry 500K. The door opening circuitry 500K in turn transmits a signal to the motor switching circuitry 206 to activate the switch, thereby activating the motor 108.

Figure 6:
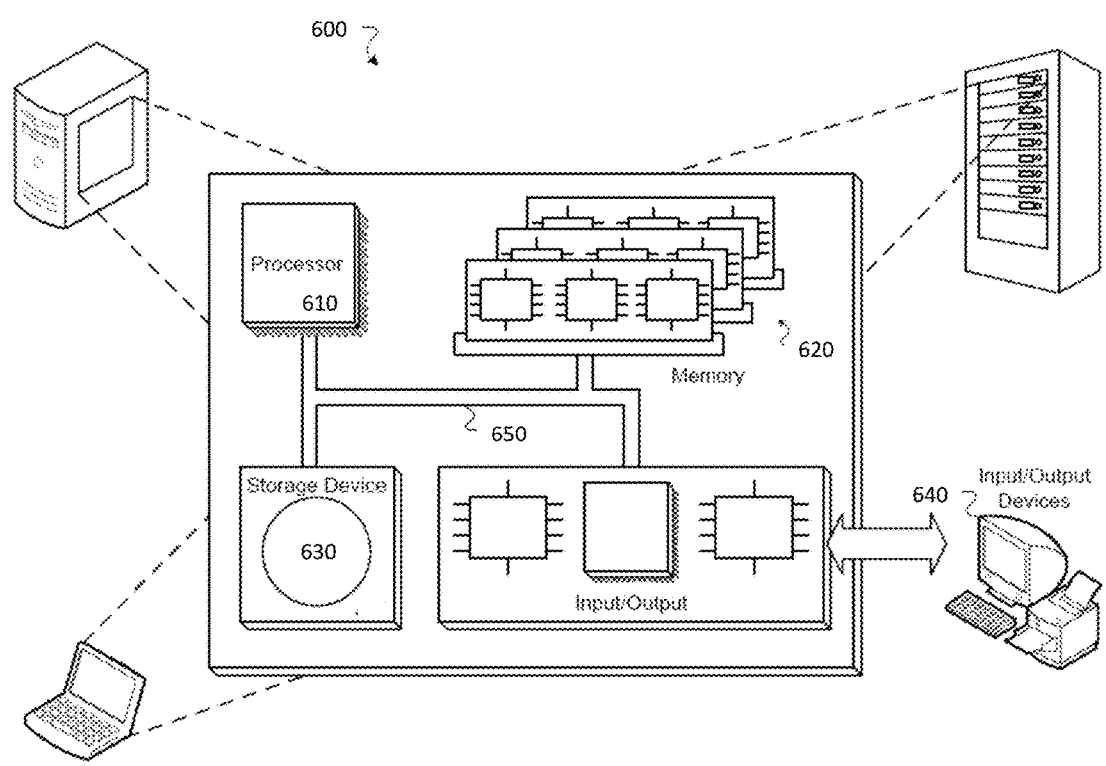
FIG. 6 is a schematic diagram of a computing system.

Referring to FIG. 5L, the thermistor circuitry 500L corresponds to circuitry for the auxiliary sensor 230 described herein. In this example, the thermistor circuitry 500L includes a thermistor 508 whose resistance varies proportionally to a temperature in the enclosed space 10 in which the thermistor 508 is located. The output signal transmitted to the microprocessor 500A through the THERMISTOR connection is, for example, the second signal indicative of the temperature of the enclosed space 10 as described herein. The controller 106 and any associated components can be part of a computing system that facilitates control of the ventilation system 100 according to processes and methods described herein. FIG. 6 is a schematic diagram of an example of a computer system 600 that can be used to implement the controller 106 described in association with any of the computer-implemented methods described herein. The system 600 includes a processor 610, a memory 620, a storage device 630, and an input/output device 640. Each of the components 610, 620, 630, and 640 are interconnected using a system bus 650. The processor 610 is capable of processing instructions for execution within the system 600. In some examples, the processor 610 is a single-threaded processor, while in some cases, the processor 610 is a multi-threaded processor. The processor 610 is capable of processing instructions stored in the memory 620 or on the storage device 630 to display graphical information for a user interface on the input/output device 640. In some implementations, the processor 610 can be substantially similar to the controller 106 described above with reference to FIGS. 1 and 2.

Memory storage for the system 600 can include the memory 620 as well as the storage device 630. The memory 124 described with respect to FIG. 2 can correspond to one or both of the memory 620 and the storage device 630 of FIG. 6. The memory 620 stores information within the system 600. The information can be used by the processor 610 in performing processes and methods described herein. In some examples, the memory 620 is a computer-readable storage medium. The memory 620 can include volatile memory and/or non-volatile memory. The storage device 630 is capable of providing mass storage for the system 600. In general, the storage device 630 can include any non-transitory tangible media configured to store computer readable instructions. Optionally, the storage device 630 is a computer-readable medium. Alternatively, the storage device 630 may be a floppy disk device, a hard disk device, an optical disk device, or a tape device.

The system 600 includes the input/output device 640. The input/output device 640 provides input/output operations for the system 600. In some examples, the input/output device 640 includes a keyboard and/or pointing device. In some cases, the input/output device 640 includes a display unit for displaying graphical user interfaces. Thus, for example, while depicted as wall switches in FIG. 1, the fan control units 123a, 123b can correspond to a desktop computer, a mobile phone, a mobile computing device, or other appropriate input/output device enabling the operator to control the fan speed of the exhaust fans 110a, 110b.

The features of the methods and systems described in this application can be implemented in digital electronic circuitry, or in computer hardware, firmware, or in combinations of them. The features can be implemented in a computer program product tangibly stored in an information carrier. The information carrier can be, for example, a machine-readable storage device, for execution by a programmable processor. Operations can be performed by a programmable processor executing a program of instructions to perform the functions described herein by operating on input data and generating output. The described features can be implemented in one or more computer programs that are executable on a programmable system including at least one programmable processor coupled to receive data and instructions from, and to transmit data and instructions to, a data storage system, at least one input device, and at least one output device. A computer program includes a set of instructions that can be used, directly or indirectly, in a computer to perform a certain activity or bring about a certain result. A computer program can be written in any form of programming language, including compiled or interpreted languages. The computer program can be deployed in any form, including as a stand-alone program or as a module, component, subroutine, or other unit suitable for use in a computing environment.

Generally, a computer will also include, or be operatively coupled to communicate with, one or more mass storage devices for storing data files. Such devices can include magnetic disks, such as internal hard disks and removable disks, magneto-optical disks, and optical disks. Storage devices suitable for storing the computer program instructions and data include all forms of non-volatile memory, including by way of example semiconductor memory devices, such as EPROM, EEPROM, and flash memory devices, magnetic disks such as internal hard disks and removable disks, magneto-optical disks, and CD-ROM and DVD-ROM disks. The processor and the memory can be supplemented by, or incorporated in, ASICs (application-specific integrated circuits).

To provide for interaction with a user, the features can be implemented on a computer having a display device such as a LCD (liquid crystal display) or LED (light emitting diode) monitor for displaying information to the user and a keyboard and a pointing device such as a mouse or a trackball by which the user can provide input to the computer. Alternatively, the computer can have no keyboard, mouse, or monitor attached and can be controlled remotely by another computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

The processor 610 carries out instructions related to a computer program. The processor 610 can include hardware such as logic gates, adders, multipliers and counters. The processor 610 can further include a separate arithmetic logic unit (ALU) that performs arithmetic and logical operations.

A number of implementations have been described. Nevertheless, it will be understood that various modifications may be made. Accordingly, other implementations are within the scope of the claims.

What is claimed is:

1. A method of providing ventilation for an enclosed space, the method comprising:
   receiving by a controller a first signal indicative of an electrical characteristic of a motor, the electrical characteristic being sensed during an operation of the motor;
   determining based on the first signal, by the controller including one or more processing devices, that a door to the enclosed space is in a process of opening or closing, wherein the door to the enclosed space is driven by the motor;
   generating, by the controller responsive to determining that the door to the enclosed space is in the process of opening or closing, a control signal configured to operate a ventilation system to exhaust air from within the enclosed space to an environment outside of the enclosed space;
   transmitting the control signal to the ventilation system; and
   activating the ventilation system based on the control signal.

2. The method of claim 1, wherein the enclosed space is a garage.

3. The method of claim 1, wherein the electrical characteristic is selected from the group consisting of a current, a voltage, a power, and a frequency of the motor.

4. The method of claim 1, wherein the first signal is indicative of opening of the door.

5. The method of claim 4, further comprising:
   receiving a second signal indicative of closing of the door during an operation of the ventilation system; and
   responsive to receiving the second signal, deactivating the ventilation system after a duration of time.

6. The method of claim 5, further comprising receiving a user input indicative of the duration of time.

7. The method of claim 1, further comprising:
   receiving a second signal indicative of a temperature within the enclosed space; and
   determining, based on the second signal, that the temperature is above a threshold; and
   responsive to determining that the temperature is above the threshold, operating the ventilation system to exhaust air from within the enclosed space to the environment.

8. The method of claim 7, further comprising:
   determining that the temperature is at or below the threshold; and
   deactivating, responsive to determining that the temperature is at or below the threshold, the ventilation system.

9. The method of claim 1, wherein activating the ventilation system comprises activating an exhaust fan of the ventilation system to exhaust air from within the enclosed space to the environment outside of the enclosed space.

10. The method of claim 1, wherein activating the ventilation system comprises activating a forced air damper of the ventilation system to enable air within the enclosed space to be exhausted into the environment outside of the enclosed space.

11. A system to provide ventilation for an enclosed space, the system comprising:
    a ventilation system positioned relative to the enclosed space to exhaust air from the enclosed space into an environment outside of the enclosed space;
    a sensor to generate a first signal indicative of an electrical characteristic of a motor, the electrical characteristic being sensed during an operation of the motor to open or close a door to the enclosed space; and a controller including one or more processors in communication with the sensor and the ventilation system, the controller configured to
activate the ventilation system to exhaust air from within the enclosed space to an environment outside of the enclosed space in response to determining based on the first signal from the sensor that the door is in a process of opening or closing.

12. The system of claim 11, further comprising an electrical interface configured to receive a connection for providing operating power to the motor.

13. The system of claim 12, wherein the sensor is configured to generate the first signal in response to detecting a current drawn by the motor through the electrical interface.

14. The system of claim 11, wherein the enclosed space is a garage.

15. The system of claim 11, wherein the electrical characteristic is selected from the group consisting of a current, a voltage, a power, and a frequency of the motor.

16. The system of claim 11, wherein the ventilation system comprises an exhaust fan positioned to exhaust air from the enclosed space into the environment outside of the enclosed space.

17. The system of claim 11, wherein the first signal is indicative of opening of the door.

18. The system of claim 17, wherein the controller is configured to
receive a second signal indicative of closing the door to the enclosed space during an operation of the ventilation system; and
responsive to receiving the second signal, deactivate the ventilation system after a duration of time.

19. The system of claim 11, wherein the first signal is indicative of closing of the door.

20. The system of claim 11, further comprising a temperature sensor to generate a second signal indicative of a temperature within the enclosed space,
wherein the controller is configured to
determine, based on the second signal, that the temperature is above a threshold, and
operate, responsive to determining that the temperature is above the threshold, the ventilation system to exhaust air within the enclosed space to the environment when the temperature is above the threshold.

21. A device to provide ventilation for an enclosed space, the device comprising:
a sensor to generate a first signal indicative of an electrical characteristic of a motor, the electrical characteristics being sensed during an operation of the motor to open or close a door to the enclosed space; and
a controller including one or more processors in communication with the sensor and a ventilation system, the controller configured to
activate the ventilation system to exhaust air from within the enclosed space to an environment outside of the enclosed space in response to determining based on the first signal from the sensor that the door is in a process of opening or closing.

22. The device of claim 21, further comprising an electrical interface configured to receive a connection for providing operating power to the motor.

23. The device of claim 22, wherein the sensor is configured to generate the first signal in response to detecting a current drawn by the motor through the electrical interface.

24. The device of claim 21, wherein the enclosed space is a garage.

25. The device of claim 21, wherein the electrical characteristic is selected from the group consisting of a current, a voltage, a power, and a frequency of the motor.

26. The device of claim 21, wherein the controller is configured to activate an exhaust fan of the ventilation system in response to the first signal, the exhaust fan positioned to exhaust air from the enclosed space into the environment outside of the enclosed space.

27. The device of claim 21, wherein the first signal is indicative of opening of the door.

28. The device of claim 27, wherein the controller is configured to
receive a second signal indicative of closing the door to the enclosed space during an operation of the ventilation system; and
responsive to receiving the second signal, deactivate the ventilation system after a duration of time.

29. The device of claim 21, wherein the first signal is indicative of closing of the door.

30. The device of claim 21, further comprising a temperature sensor to generate a second signal indicative of a temperature within the enclosed space,
wherein the controller is configured to
determine, based on the second signal, that the temperature is above a threshold, and
operate, responsive to determining that the temperature is above the threshold, the ventilation system to exhaust air within the enclosed space to the environment when the temperature is above the threshold.

31. The method of claim 1, wherein generating the control signal configured to operate the ventilation system further comprises generating the control signal responsive to a value of the electrical characteristic of the motor being outside of a predefined range.

* * * * *